Oct. 25, 1932.   R. C. BENNER ET AL   1,884,528
FORMING ARTICLES FROM GRANULAR MIXES
Filed Jan. 28, 1929   2 Sheets-Sheet 1
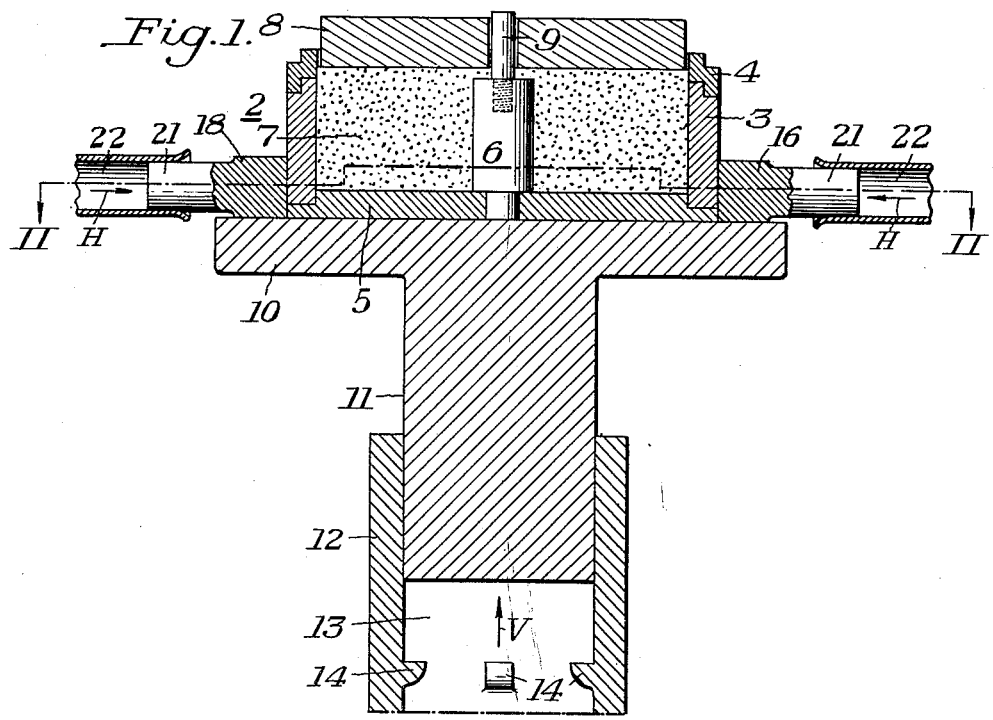
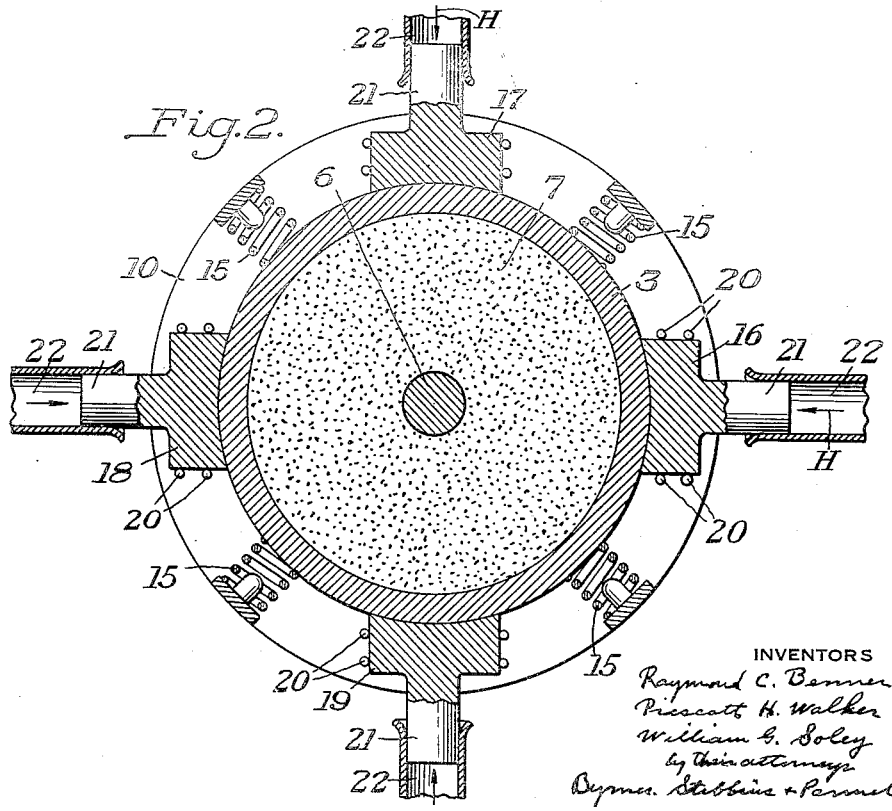
INVENTORS
Raymond C. Benner
Prescott H. Walker
William G. Soley
by their attorneys
Byrnes, Stebbins & Parmelee Oct. 25, 1932.   R. C. BENNER ET AL   1,884,528
FORMING ARTICLES FROM GRANULAR MIXES
Filed Jan. 28, 1929   2 Sheets-Sheet 2

INVENTORS

Patented Oct. 25, 1932

1,884,528

UNITED STATES PATENT OFFICE

RAYMOND C. BENNER, PRESCOTT H. WALKER AND WILLIAM G. SOLEY, OF NIAGARA FALLS, NEW YORK, ASSIGNORS TO THE CARBORUNDUM COMPANY, OF NIAGARA FALLS, NEW YORK, A CORPORATION OF PENNSYLVANIA

FORMING ARTICLES FROM GRANULAR MIXES

Application filed January 28, 1929. Serial No. 335,519.

This application is a continuation in part of our copending application, Serial No. 298,-215, filed August 8, 1928.

The present invention relates to forming articles from granular mixes, and more especially to the forming of abrasive or refractory molded articles from mixes containing granular materials and bond. The invention relates especially to the method of so forming the articles as to secure a substantially uniform distribution or volume density of the material in the completed article, and to the completed articles as so made.

The invention will be hereinafter described with particular reference to its embodiment in a method of making bonded abrasive wheels. In this method the mixture of abrasive grains and bond is put into the wheel mold and manipulated so as to secure a substantially uniform distribution of the mix in the mold. By substantially uniform distribution we mean that the grain and bond are substantially uniformly distributed, and that the mass has substantially the same amount of material per unit volume throughout the mass.

The wheel mold, which is provided with the strike-off ring, is filled with the mix and is jolted. During the jolting a relatively light consolidating pressure is applied to the mix. This results in compacting the material or giving it a preliminary consolidation in which the mass is given the desired substantial uniform distribution of material throughout. After the mass is thus given the preliminary consolidation the strike-off ring is removed, the excess material is stricken off, and the material remaining in the mold is given the final heavy pressure to consolidate it into the finished compressed wheel. The jolting of the mold and contained material tends to break up and distribute any local concentrations of greater density. The jolting may be carried out alone to secure this effect, although it is much preferred to accompany the jolting with a relatively light pressure, sufficient, however, to give the mass a preliminary compacting.

The preliminary compacting pressure may be applied in various ways, such, for example, as by a plate, by a series of weights, or by a fluid pressed diaphragm.

As hereinafter described in greater detail, the direction of jolting has an effect upon the orientation of the grains of the material which have unequal dimensions, that is to say, grains of material which are thinner in one direction, such as those resulting from the crushing of flake-like crystals. It is found that a flattened or flake-like particle tends to orient itself to lie in a plane normal to the direction of jolting. Therefore, by controlling the direction or directions of jolting the orientation of particles may be controlled.

Before describing the method we will briefly refer to the problem, with particular reference to the making of abrasive articles, such as grinding wheels.

Abrasive articles have, in most cases, a relatively high porosity and should be as uniform in physical character as possible. Non-uniformity tends to produce uneven grinding action, and also introduces an element of danger by unbalancing the grinding wheels, which are usually operated at high speeds.

Uniformity is desirable from two points of view. From one point of view the uniformity of large sections, for example cross-sectional halves of a wheel, is important. Difference in the weight of such large sections due to greater density in one than in another causes unbalancing of the wheel. Such a condition should be compensated for, for the wheel will not grind evenly and may be dangerous to operate.

Under present methods the most satisfactory way of overcoming this, for commercial use of the wheels, is to use a counterbalancing insertion at the arbor. For certain classes of work, such, for example, as precision grinding, the wheel must have as nearly static balance as possible. This fixes a limit in the difference in weight between two large portions of the wheel of less than that required at the circumference to overcome the rolling friction of the wheel on the testing ways, and is usually of the order of magnitude of less than 1/2500ths of the weight of the wheel.

The second standpoint as to uniformity is that of local uniformity or uniformity of small sections or portions of the wheel; for example, areas occupied by from 50 to 100 grains. Differences in bond grain distribution and the pore spaces between one section and another affect the abrasive quality of the wheel, that is, the ability of the wheel to remain cool and to grind without leaving chatter marks. Differences in the distribution of grain, bond and pore spaces also affect the dynamic balance of the wheel.

Refractory articles, such as refractory brick, while generally of much lower porosity than abrasive articles, should have a uniform structure or packing of the granular refractory material. Non-uniformity of physical structure will result in uneven strains and possible rupture under varying temperature conditions. It is therefore desirable that the internal structure of such refractory articles be as nearly uniform as possible.

Two methods have heretofore been mainly used in the forming of such abrasive and refractory articles. One of them, called the "puddle process" employs a very wet mixture or slip containing usually about 20% of water. The other process, known by various names according to the pressure applying means, consists in molding under pressure a damp mix usually containing only about 2.5% of water. Each of these processes has advantages and disadvantages. The puddle process produces articles of fairly uniform porosity but requires a long time for drying because of the large percentage of contained water. This is objectionable from the standpoint of quantity production, and moreover, articles so made must be cut or trimmed down to the desired shape or size after drying. On the other hand, articles made from damp mixes require only a short time for drying and need less cutting down or dressing to bring them to the desired shape and size, since they can be molded to the desired form by tamping and pressing. The disadvantage with the damp mix process, whether the molded article be tamped or pressed, is that the articles have a low and uneven porosity.

In carrying out our process we prefer to use a damp mix rather than the wet slip used in the puddle process. According to our preferred process, this damp mix is placed in the mold and jolted while being subjected to a preliminary consolidating pressure which is preferably substantially uniformly distributed over the top of the material in the mold. The jolting is applied to the material while the material is under relatively slight pressure at most, and is therefore free to shift so that local concentrations of higher density may be broken up and a substantially uniform volume density obtained throughout the mass of the material. The application of the jolting as a preliminary operation and while the material is not subjected to heavy pressure, is to be distinguished from the application of jolting during a heavy final consolidating pressure. The jolting during the final consolidating pressure while tending to compact the material, does not have the effect of breaking up local dense areas and giving the substantial uniform distribution obtainable by the jolting as a preliminary operation prior to the application of the final or consolidating pressure.

In the making of abrasive wheels, for example, by the damp mix method, the final consolidating pressure applied is usually a few thousand pounds per square inch, often about five thousand pounds per square inch, whereas the preliminary pressure which we apply during the jolting operation is relatively light, usually a few pounds per square inch and preferably never exceeding a few hundred pounds per square inch. It can be readily seen that the granular products under the conditions which we maintain during the jolting have a freedom to adjust themselves to a substantially uniform distribution of volume density which would not be attainable under heavier pressures.

Having as a preliminary operation secured a substantially uniform distribution of grain and bond of the mix in the mold, and having broken up any local denser concentrations and thereby securing substantially the same amount of materials per unit volume throughout the mass, the strike-off ring is removed and the excess material struck off in the usual manner of making such articles. The material remaining in the mold, which has the desired substantial uniform distribution, is then in condition for applying the final consolidating heavy pressure, which can be applied in the usual way. Since the material in the mold is uniformly distributed and has a uniform volume density, such uniform distribution is retained in the finished article formed by compressing it under the usual heavy consolidating pressure.

The preferred procedure will be now described in detail with particular reference to the accompanying drawings, in which—

Figure 1 is a vertical section through a mold and its support, the parts being shown in a central or neutral position;

Figure 2 is a horizontal section along the line II—II of Figure 1, the parts also being in a central or neutral position;

Figure 3:
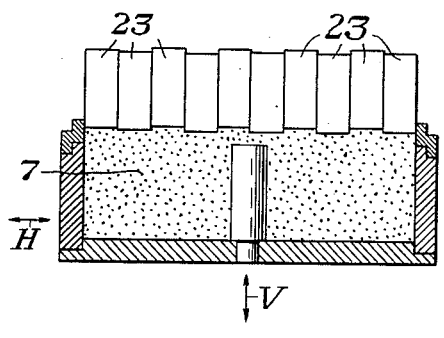
Figure 3 is a vertical section through a mold showing a modification.

Referring first to the embodiment of the invention illustrated in Figures 1 and 2. The mold 2 is a two-barrel mold formed of the main retaining or body ring 3 and the strike-off ring 4. The body ring 3 is supported on the base plate 5. A central core 6 is provided for forming the arbor hole in the abrasive wheel. The abrasive mix is indicated at 7 in the mold. The abrasive mix 7 may be shoveled in by hand and smoothed off. A follower plate 8 is then placed upon the top of the mix. The follower plate 8 has sufficient weight to apply the desired pressure for preliminarily consolidating the material. While the follower plate might be omitted, it is much preferred to use a follower plate, even though the plate is relatively light, in order to prevent the material from jumping out of the mold during the jarring.

The follower plate 8 is held in position by the strike-off ring 4 and a post 9 which projects from the top of the core-forming post 6. The mold is placed on a table 10 which may be given a vertical jolting, jarring or vibrating movement in any suitable way. For purposes of diagrammatic illustration, we have shown the table 10 as having a plunger-like support 11 fitting in the top of an air cylinder 12. Air pressure may be admitted to the chamber 13 of the cylinder to raise the plunger 11. When the air pressure is released the plunger drops against the stop shoulder 14, thus imparting a downward vertical jarring or jolting to the table and the mold carried thereon. The mold may be provided with means for jolting, jarring or vibrating the mold in a plurality of horizontal directions, as shown in Figure 2. As shown in Figure 2, the mold is held evenly centered on the table 10 by means of centering springs 15 which are mounted on the table and bear against the outside of the mold body 3. Four pneumatically operated tappers or hammers 16, 17, 18 and 19, are shown adapted to act against the outside of the mold. These hammers are guided by pins 20. The hammers 16, 17, 18 and 19 each has a plunger 21 sliding in the end of air cylinders 22. By applying pulsations of air pressure in the cylinders 22 the respective air tappers or hammers may be operated to tap the sides of the mold and to jar or jolt it horizontally. The operation of the tappers 16 and 18 will be to jar the mold back and forth in one horizontal direction, and that of the hammers 17 and 19 to jar it back and forth in a direction at right angles to the first direction. It is preferred to jar or jolt the mold in both vertical and horizontal directions, and preferably in a plurality of horizontal directions, as will be more fully hereinafter explained. The type of jolting which is obtained and which is desirable is distinguished from a mere vibration, the jolting resulting from the quick acceleration and deceleration of the mold. The jolting or jarring contemplated is one wherein the entire mass within the mold is actually moved through an appreciable distance, the movement being sudden. It is thus distinguished from vibration of the mold which does not impart actual motion to the mass within the mold.

In Figure 3 there is illustrated a modification in which, instead of the one-piece follower plate 8 shown in Figure 1, a plurality of weights 23 are employed to apply the preliminary consolidating pressure to the granular mix 7 in the mold. The follower formed of the plurality of weights is better adapted to secure a uniform volume density of distribution of the mix than a one-piece plate, since the individual plungers or weights 23 can adapt themselves to the surface irregularities of the top of the mix and can more readily follow up such depressions as may be formed in the top of the mix over places in the mix where the original density is below the average. Also, the mix is freer to shrink in a vertical direction over the places of lesser density than with a single follower plate. The plungers 23 may be of any suitable form, preferably square throughout the greater part of the area but having their edges rounded at the circumference of the mold so as to substantially fill the open top of the mold cavity and to apply the pressure which is automatically distributed over the top of the mix because of the freedom of the individual weights to rise or fall.

The mold shown in Figure 3 may be mounted like that shown in Figure 1, to be jolted preferably both vertically and horizontally, although jolting in but one direction may be employed if desired.

Figure 4:
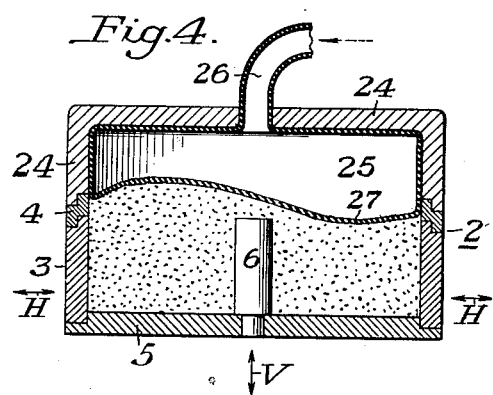
Figure 4 is another vertical section through a mold showing still another modification.

In Figure 4 is illustrated another modification showing a device specifically intended to secure a consolidated pressure substantially uniformly distributed throughout the entire area of the upper surface of the material. As shown in Figure 4, the mold 2 has the usual body 3 and strike-off ring 4 and base plate 5 and core-forming post 6. The mixture 7 of abrasive grains and bond is shoveled into the mold by hand and leveled off by hand in the usual way. A metal cap 24 is then secured by suitable clamping means (not shown) to the top of the mold. The cap 24 holds a rubber bag 25 having a supply tube 26 going to any suitable source of air under pressure. The lower face 27 of the rubber bag 25 forms a flexible diaphragm which presses against the top of the mix with the desired pressure. An air pressure in the neighborhood of fifteen pounds per square inch has been, in general, found satisfactory to give the preliminary consolidating pressure. Such a pressure will serve to preliminarily compact the material, but it is not sufficient to prevent the self-adjustment of the material to secure uniformity of distribution under the jarring to which the mold is subjected.

The flexible diaphragm 27 will accommodate itself not only to the major surface irregularities, but also to the small surface irregularities, and therefore applies a pressure which is substantially uniformly distributed over the entire area of the upper surface of the mix, that is to say, each minute infinitesimal portion of the area of such surface has supplied to it the same pressure. In this way the consolidating pressure is substantially uniformly distributed throughout the entire area of the surface.

The mold shown in Figure 4 may be mounted like that shown in Figure 1, to be jolted or jarred in both vertical and horizontal directions as indicated by the vertical and horizontal arrows V and H.

Claims for applying such substantially uniformly distributed pressure and to the apparatus for producing it, and specifically to the inflated flexible bag, are presented in our copending application, Serial No. 335,520, filed of even date herewith. The claims in such copending application are directed specifically to this method of securing the uniformly distributed pressure irrespective of whether the mold is jarred or not. The claims in the present application include such method of applying the pressure only in connection with the jarring or jolting.

The jolting or jarring breaks up and disperses any locally more dense portions or masses in the mix. It tends to cause the mix to shift itself into position and to move from the denser spots to the places of less initial density until by such self-adjustment a substantially uniform volume density is secured. The horizontal jolting will tend to break up or throw off of their bases any local denser columnar distributions of the mix. The vertical jolting will tend to break up any horizontal strata. It is therefore preferred to use both vertical and horizontal jolting, although jolting in one direction may be employed since it alone will tend to cause the breaking up of denser local concentrations and the more uniform distribution of the mix.

As pointed out above, the jolting is preferably accompanied by the application of a preliminary consolidating pressure applied either by a follower plate, weights or a flexible diaphragm. The jolting assists the consolidating pressure in packing the mix in the mold, but at the same time tends to break up any local dense spots and to cause the particles of the mix to shift among themselves to secure the even distribution of the granular material and bond. The consolidating pressure should not be heavy enough to so compact the material as to prevent the relatively free self-adjustment of the mix under the jolting.

The jolting, and particularly directionally controlled jolting, has an effect upon the orientation of abrasive grains in the mixture, particularly where the abrasive grains or part of them are of a flaky or plate-like form. Some crystalline materials, such as silicon carbide, tend to break up into crystalline particles of a general plate-like form, as contrasted with particles in which the length, width and thickness are all equal. Moreover, when any granular abrasive material is crushed, the particles will tend to have irregular dimensions so that most particles will be thinner in one direction. If a mass of such material is jolted in one direction, say, the vertical direction, the particles will tend to orient themselves so that their smallest dimensions will tend to lie in the same direction as that of the jolting. This is particularly noticeable in crystalline materials which break up into a plate-like form. When such material is jolted, say, vertically, the plates or flakes tend to lie horizontally.

By suitably controlling the direction of jolting, the orientation of the particles may be controlled. For example, by jolting the mix as shown in Figure 1 in a vertical direction only, the plate or flake-like particles may be oriented so as to lie horizontally and present their edges to the periphery or grinding edge of the wheel. If it is desired not to have the particles uniformly oriented in any particular direction but rather to have a haphazard orientation of the abrasive particles, this can be accomplished even with flaky materials by combining the jolting in different directions, preferably vertically and in a plurality of horizontal directions. By applying the jolting in three directions at substantially right angles to each other, a fully haphazard orientation of the particles may be secured, so that an abrasive article made in this way will not have any tendency toward stratification even when made with flaky particles. After the granular mix 7 has been jolted to secure the substantial uniform distribution of the mix, and the material has been preliminarily but not heavily compacted in the mold, the strike-off ring 4 is removed and the top surface of the mix is leveled off with a straight edge, as in the usual practice of making abrasive wheels. The mixture remaining in the body portion 5 of the mold is then subjected to the final forming pressure by means of a plunger to compact the wheel. This final forming pressure is very much higher than the preliminary pressure exerted by the followers or the rubber bag, and is generally in the neighborhood of some thousands of pounds to the square inch.

Since the material remaining in the mold has a substantial uniformity of distribution of grain and bond, the wheel produced by the final compacting operation has this substantial uniform distribution. This results in a wheel which has not only better balance because of uniformity in large sections, but one which has better grinding qualities because of greater uniformity in small sections.

Figure 5:
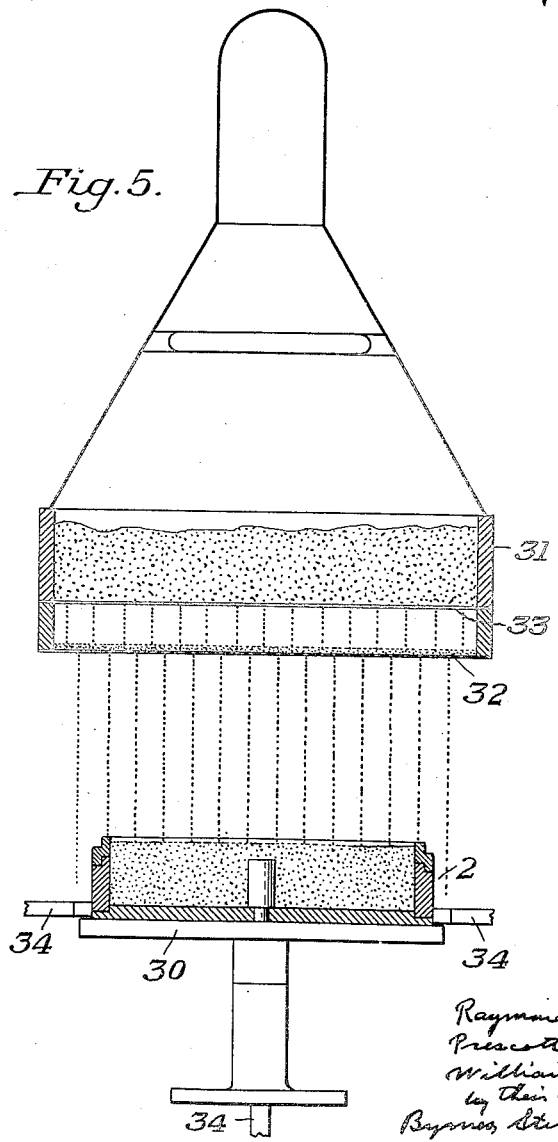
Figure 5 is a side elevation, partly in section, illustrating a preliminary operation of sifting the material in the mold which may or may not precede the preliminary consolidation.

While ordinarily the mixture will be scooped into the mold by hand, since the jolting will break up any inequalities due to throwing in the material with the scoop, the material may be sifted into the mold by a riddle, as described in our copending application, Serial No. 245,659, filed January 10, 1928. The depositing of the material in the mold in such manner is illustrated in Figure 5, in which the mold 2 is carried on a turntable 30. Suspended above the mold is a gyratory riddle 31. As described in such copending application, the riddle is preferably provided with a lower screen 32 and one or more upper screens 33. The riddle screen is preferably at least 25% larger in diameter than the mold. The mold is rotated on the turntable and the riddle is vibrated. The mixture of grain and bond is sifted through the riddle screens into the mold. During the filling of the mold, it may be gently tapped or jarred, either vertically or horizontally, or both, by means of tappers 34. The tapping may be omitted, or if employed should be gentle.

As the mix is fed through the screens of the riddle there is a rubbing action of grain upon grain, and of the grains upon the wires of the screens, whereby excess of bond material on one grain is rubbed off and deposited on another. The use of the riddle, therefore, tends to not only deposit the mixture more uniformly initially in the mold, but also tends to give a better distribution of bond to grain. The effects of the use of the riddle, and of the jolting during the application of the preliminary consolidating pressure, are somewhat akin, namely, to cause a uniform distribution of grain and bond in the completed article. While either of these may be used alone, they may be combined to get the combined beneficial effects.

While the invention has been specifically illustrated and described with reference to the making or abrasive wheels, it may be employed in the making of other articles from mixes of grain and bond; for example, in the making of refractory articles. As above set forth, the articles produced are superior and have certain characteristics which are inherent from the jolting process employed, such as the substantial uniformity of distribution of grain and bond, pore space, etc., not to mention the control of the orientation of irregular shaped particles.

In the case of abrasive wheels they are more evenly balanced and the physical conditions of local portions of the wheel are more uniform, thus keeping the wheel cool and avoiding chatter marks during its operation. Both the static and dynamic balance of the wheel are improved. It will be understood that the usual variations may be made in the amount of bond, the character of the bond, the wetness of the mix, etc.

While the present invention has been specifically illustrated and described, it is to be understood that the invention is not so limited but may be otherwise embodied and practiced within the scope of the following claims.

We claim:

1. The method of forming articles from mixes of granular material and bond, which comprises placing the mix in a mold and subjecting the mold to jolting to produce substantial uniformity of distribution of the mix therein, and thereafter striking off the excess mix and applying the final forming pressure to compress the mix remaining in the mold.

2. The method of forming articles from mixes of granular material and bond, which comprises placing the mix in a mold and subjecting the mold to a relatively light consolidating pressure and to jolting to produce substantial uniformity of distribution of the mix during such preliminary consolidation, and thereafter striking off the excess mix and applying a relatively heavy final forming pressure to compress the mix remaining in the mold.

3. The method of forming articles from mixes of granular material and bond, which comprises subjecting the mix to a preliminary forming consolidation by subjecting the mix to a relatively light forming pressure accompanied by jolting so as to produce substantial uniformity of distribution of the mix, and thereafter applying a relatively heavy final forming pressure to compress the mix.

4. The method of forming articles from mixes of granular material and bond, which comprises placing the mix in a mold and jolting it in a plurality of directions so as to produce substantial uniformity of distribution of the mix therein, and thereafter striking off the excess mix and applying a final forming pressure to compress the mix remaining in the mold.

5. The method of forming articles from mixes of granular material and bond, which comprises placing the mix in a mold and subjecting it to a preliminary forming operation by applying a relatively light pressure accompanied by jolting in a plurality of directions so as to produce substantial uniformity of distribution of the mix in the mold, and thereafter striking off the excess mix and applying a relatively heavy final forming pressure to compress the mix remaining in the mold.

6. The method of forming articles from mixes of granular material and bond, which comprises adding the mix to a mold in small uniformly distributed portions, jolting the mix thus added to the mold while subjecting it to a relatively light preliminary forming pressure so as to produce substantial uniformity of distribution of the mix in the mold, and thereafter applying a relatively heavy final forming pressure to compress the mix.

7. The method of forming articles from mixes of granular material and bond, which comprises sifting the mix into a mold and jolting the mold and applying a relatively light consolidating pressure to the mix therein, so as to secure substantial uniformity of distribution of the mix in the mold, and thereafter striking off the excess mix and applying a relatively heavy final forming pressure to compress the mix remaining in the mold.

8. Those steps in the herein described method of forming articles from bond-containing granular mixes, which comprise depositing the mix in a mold in small uniformly distributed portions and subjecting the mold to jolting.

9. Those steps in the herein described method of forming articles from bond-containing granular mixes, which comprise placing the mix in a mold and subjecting it to jolting in a plurality of horizontal directions and in different planes.

10. Those steps in the herein described method of forming articles from bond-containing granular mixes, which comprise placing the mix in a mold and subjecting it to jolting in a plurality of directions while subjecting it to a relatively light preliminary consolidating pressure which remains normal to all parts of the exposed surface of the mix as the grain and bond become distributed more uniformly through the jolting.

11. Those steps in the herein described method of forming articles from bond-containing granular mixes, which comprise placing the mix in a mold and subjecting it to jolting both vertically and in a plurality of directions horizontally by subjecting it to sudden accelerations and decelerations.

12. Those steps in the herein described method of forming articles from bond-containing granular mixes, which comprise placing the mix in a mold and subjecting it to jolting both vertically and horizontally while subjecting the mix to a relatively light preliminary consolidating pressure which remains normal to all parts of the exposed surface of the mix as the grain and bond become distributed more uniformly through jolting.

13. The method of forming articles from mixes of granular material and bond, which comprises placing the mix in a mold, applying a consolidating pressure distributed substantially uniformly over the entire surface of the mix exposed in the mold, and jolting the mold by effecting movement of the mold intermittently in a plurality of directions acting in different planes.

14. The method of forming articles from mixes of granular material and bond, which comprises sifting the mix into the mold with substantial uniform distribution therein, thereafter compacting the material by the action of a substantially fluid pressure acting directly on the exposed surface of the mix and while the mold is being jolted.

15. The method of forming articles from mixes of granular material and bond, which comprises placing the mix in a mold and applying to the surface of such mix in the mold a flexible diaphragm having a substantial uniformly distributed fluid pressure applied thereto so as to consolidate the mix, and jolting the mold.

16. Apparatus for forming articles from mixes of granular material and bond, comprising a mold for receiving such mix, and means for jolting the mold in a plurality of directions by imparting sudden accelerating and decelerating motion thereto so as to secure substantial uniformity of distribution of the mix therein.

17. Apparatus for forming articles from mixes of granular material and bond, comprising a mold for receiving such mix, and means for effecting a quick, sharp jolting of the mold both vertically and horizontally through actual movement of the mold and its contents so as to secure substantial uniformity of distribution of the mix therein.

18. Apparatus for forming articles from mixes of granular material and bond, comprising a mold for receiving such mix, and means for jolting the mold both vertically and in a plurality of horizontal directions so as to secure substantial uniformity of distribution of the mix therein.

19. The process of making articles from mixes of granular material and bond, which comprises placing the mix in a mold and jolting it in a plurality of directions horizontally and vertically so as to control the orientation of the granular particles.

20. Apparatus for forming articles from mixes of granular material and bond which comprises, in combination, a mold, a removable upper ring interfitting with said mold, means for subjecting the mold to a jolting operation, means for applying a relatively light preliminary consolidating pressure during the jolting, and means for subjecting the mix remaining in the mold to a relatively heavy article forming pressure.

21. The steps in the herein described method of forming articles from bond-containing granular mixes, which comprise placing the mix in a mold whose base is approximately horizontal, applying a light pressure to the exposed surface of the mix, and simultaneously jolting the mold, some of the jolts being in horizontal directions and other jolts being in vertical directions.

22. The steps in the herein described method of forming articles from bond-containing granular mixes, which comprise placing the mix in a mold, applying a relatively light pressure to the exposed surface of the mix, simultaneously jolting the mold, some of the jolts being in a plurality of horizontal directions and others of the jolts being in a vertical direction, and applying a final forming pressure which is many times greater than the pressure applied during the jolting.

In testimony whereof we have hereunto set our hands.

RAYMOND C. BENNER.
PRESCOTT H. WALKER.
WILLIAM G. SOLEY.